US010313751B2

(12) United States Patent
Greenberger et al.

(10) Patent No.: US 10,313,751 B2
(45) Date of Patent: Jun. 4, 2019

(54) DIGITAL DISPLAY VIEWER BASED ON LOCATION

(71) Applicant: International Business Machines Corporation, Armonk, NY (US)

(72) Inventors: Jeremy A. Greenberger, Raleigh, NC (US); Zachary M. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/280,066

(22) Filed: Sep. 29, 2016

(65) Prior Publication Data

US 2018/0091854 A1    Mar. 29, 2018

(51) Int. Cl.
*H04H 60/33*     (2008.01)
*H04N 21/442*    (2011.01)
*H04N 21/414*    (2011.01)
*H04N 21/466*    (2011.01)
*H04N 21/2668*   (2011.01)
*H04N 21/258*    (2011.01)
*H04N 21/45*     (2011.01)

(52) U.S. Cl.
CPC . *H04N 21/44218* (2013.01); *H04N 21/25841* (2013.01); *H04N 21/25883* (2013.01); *H04N 21/2668* (2013.01); *H04N 21/41415* (2013.01); *H04N 21/4524* (2013.01); *H04N 21/4667* (2013.01)

(58) Field of Classification Search
CPC ......... H04N 21/25883; H04N 21/4532; H04N 21/812; G06Q 30/0261
See application file for complete search history.

(56) References Cited

U.S. PATENT DOCUMENTS

| | | | |
|---|---|---|---|
| 7,024,180 B2 * | 4/2006 | Waters | G09F 3/00 455/412.1 |
| 7,228,634 B1 | 6/2007 | Reich | |
| 8,094,103 B2 | 1/2012 | Imai et al. | |

(Continued)

OTHER PUBLICATIONS

Zafari et al.; "Microlocation for Internet-of-Things-Equipped Smart Building", IEEE Internet of Things Journal, vol. 3, Issue 1, Feb. 2016, pp. 96-112.

(Continued)

*Primary Examiner* — Olugbenga O Idowu
(74) *Attorney, Agent, or Firm* — Heslin Rothenberg Farley & Mesiti P.C.; Michael Petrocelli, Esq.

(57) ABSTRACT

A method, computer program product, and system for determining whether an individual at a venue views content in a monitor includes a processor defining a venue that includes at least one monitor for viewing content, where the at least one monitor has a viewing angle and the at least one monitor is viewable by an individual situated within a viewing cone defined by the viewing angle and within a pre-determined perpendicular distance from monitor. The processor identifies, based on communicating with location services on each client of a plurality of clients, a plurality of users (associated with the clients) entering the venue. The processor determines, in real time, for each user of the plurality of users and for each monitor of at least one monitor, a likelihood that the user is viewing the at least one monitor, wherein the determining comprises, for each user.

16 Claims, 8 Drawing Sheets

(56) References Cited

U.S. PATENT DOCUMENTS

| | | |
|---|---|---|
| 9,264,769 B2 | 2/2016 | Baker et al. |
| 2012/0001828 A1 | 1/2012 | Gallagher et al. |
| 2012/0327113 A1 | 12/2012 | Huston |
| 2014/0137142 A1* | 5/2014 | Yeh .................. H04N 21/44218 725/10 |
| 2014/0196143 A1 | 7/2014 | Fliderman et al. |
| 2015/0253845 A1 | 9/2015 | Kempinski et al. |
| 2015/0302647 A1 | 10/2015 | Osterhout et al. |
| 2015/0339846 A1 | 11/2015 | Holzer et al. |
| 2016/0070356 A1 | 3/2016 | Aguirre et al. |
| 2016/0071185 A1 | 3/2016 | Zhao et al. |
| 2016/0094832 A1 | 3/2016 | Chan et al. |
| 2017/0289596 A1* | 10/2017 | Krasadakis ...... H04N 21/25883 |
| 2018/0032997 A1* | 2/2018 | Gordon .............. G06Q 20/3224 |

OTHER PUBLICATIONS

Mochiduki et al.; "Analysis of Head Movement When Viewing a Wide-Viewing-Angle Display", GCCE IEEE 4th Global Conference on, Oct. 27-30, 2015, pp. 418-422.

Peter Mell et al., "The NIST Definition of Cloud Computing", National Institute of Standards and Technology, U.S. Department of Commerce, NIST Special Publication 800-145, Sep. 2011, 7 pages.

* cited by examiner

DIGITAL DISPLAY VIEWER BASED ON LOCATION

BACKGROUND

Entertainment providers are looking to provide individuals who utilize their content with an immersive experience. However, today, it is difficult to detect exactly who is watching content on a particular monitor, including on a television. This challenge is particularly difficult when venues utilize more than one monitor to provide content to individuals inside the venue. Environments with multiple monitors are becoming extremely popular. It is not uncommon to eat in a restaurant with multiple televisions on different stations, or visit a retail venue using content on monitors to increase interest in certain products. When these monitors provide different content to individuals inside a venue, it is difficult to determine who is watching each monitor. Understanding who is watching which content is desirable, for example, because this information would help content providers understand which content is effective within a given venues and most effective at capturing the interest of targeted demographic groups.

SUMMARY

Shortcomings of the prior art are overcome and additional advantages are provided through the provision of a method for determining if users at a venue have viewed content on at least one monitor. The method includes, for instance: defining, by one or more processors, a venue comprising at least one monitor for viewing content, wherein the at least one monitor comprises a viewing angle and the at least one monitor is viewable by an individual situated within a viewing cone defined by the viewing angle and within a pre-determined perpendicular distance from monitor; identifying, by the one or more processors, based on communicating with location services on each client of a plurality of clients, a plurality of users entering the venue, wherein each client of the plurality of clients comprises a wireless device associated with a respective user of the plurality of users; determining, by the one or more processors, in real time, for each user of the plurality of users and for each monitor of at least one monitor, a likelihood that the user is viewing the at least one monitor, wherein the determining comprises, for each user: determining, by the one or more processors, in real time, if a current location of the client is within the viewing cone; based on determining that the client is within the viewing cone, determining, by the one or more processors, a trajectory of the client; based on the trajectory of the client, determining, by the one or more processors, if the client is within the pre-determined perpendicular distance from monitor; and based on determining that the client is within the pre-determined perpendicular distance, assigning, by the one or more processors, a confidence level to the user, wherein a higher confidence level indicates a greater likelihood the user is viewing the at least one monitor and a lower confidence level indicates a lower likelihood the user is viewing the at least one monitor.

Methods, computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
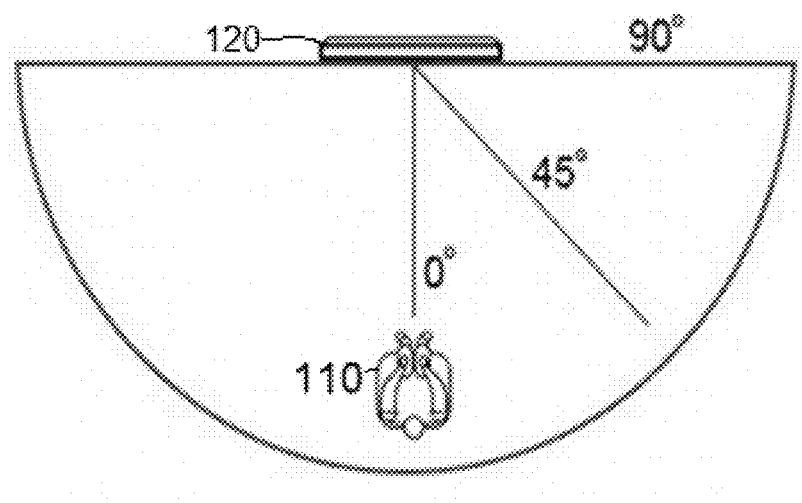
FIG. 1 depicts a workflow associated with aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
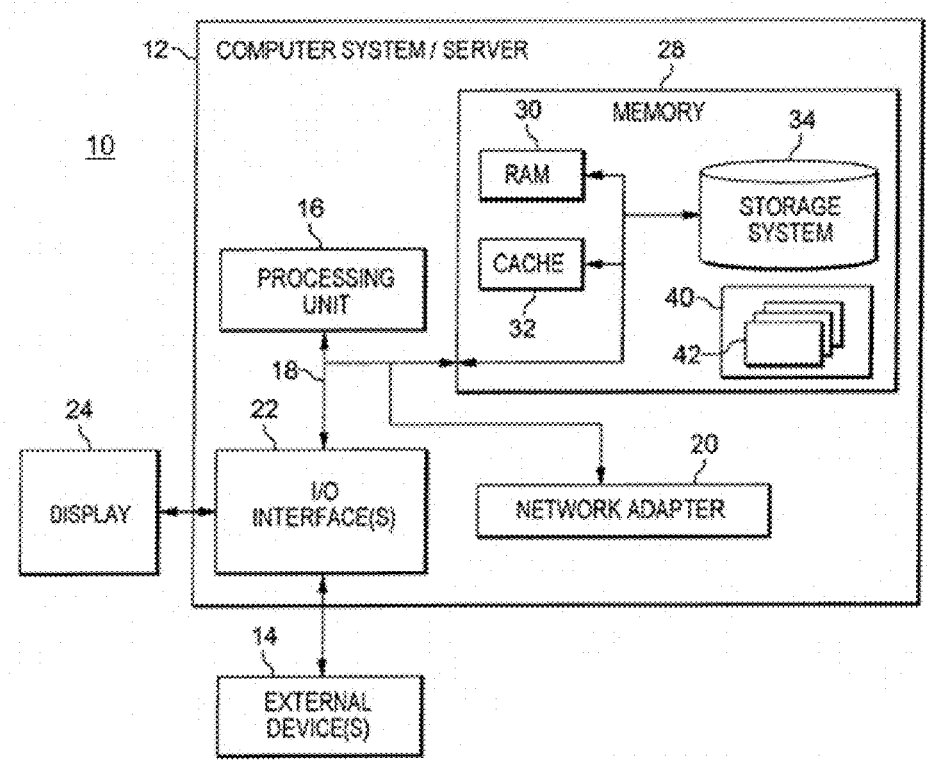
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, may be stored in memory 28.

Embodiments of the present invention, provide a novel utilization of micro-location technologies, enabling one or more programs executing on at least one processing circuit to determine, with a degree of confidence, who is watching content on a given monitor, by determining who is within a viewing angle of the monitor. Throughout this application, the word monitor is used to refer to displays or screens for viewing content, including but not limited to, televisions and/or digital displays. A viewing angle is the maximum angle at which a display can be viewed with acceptable visual performance. This angular range is called a "viewing cone" and is defined by a multitude of viewing directions. Viewing angles of a pictured monitor (e.g., television monitor) are illustrated in FIG. 1. As seen in this illustration, an individual 110 is situation at a 0° angle relative to a monitor 120. The figure also illustrates what a 45° angle and what a 90° angle would look like for the pictured monitor 120. As understood by one of skill in the art, the viewing angle (i.e., the maximum angle at which a display can be viewed with acceptable visual performance) of a given monitor 120 varies in accordance with the monitor 120 itself. For example, the viewing angles for a group of common television monitors may vary from a 21° viewing angle to an 84° viewing angle. Thus, referring to FIG. 1, if the viewing angle of the monitor 120 were 45°, an individual situated from the 0° angle to 45 degrees in either direction from the location of the individual 110 would be within the viewing cone of the monitor 120. Individuals closer to the 0° of the individual 110 would have a higher probability of observing the content on the monitor 120, but any individual within the viewing cone, a range 45 degrees in either direction from the location of the individual 110, would be capable of viewing the content on the monitor 110. Additionally, individuals within the cone who are physically closer to the monitor would be more likely to view the content of the monitor than individuals within the cone that are farther from the monitor.

Aspects of embodiments of the present invention represent improvements to existing computing technology and are inextricably tied to computing. Not only do some embodiments of the present invention rely upon determining the location of a given individual by utilizing location services on a computing device of the individual, because content is increasingly distributed over computer media, utilizing computing technology to gain a better understanding of who is accessing content provides a tangible benefit to providers who create and distribute content. Aspects of embodiments of the present invention enable these providers to improve their content distribution through enhanced targeting of content to individuals that the program code in embodiments of the present invention determine is watching the content. Additionally, embodiments of the present invention utilize a unique combination of hardware devices, such as sensors, and software, in order to determine the location of individuals within a venue and ascertain, within defined levels of confidence, whether the individuals viewed content available within these physical spaces.

Based on one or more programs of an embodiment of the present invention utilizing micro-location technology to detect, with a degree of confidence, who is viewing a monitor (e.g., a television monitor), one or more programs executing on at least one processing circuit in certain embodiments of the present invention may perform additional actions that enhance content delivery to detect probable viewers of the content on the monitor. In an embodiment of the present invention, one or more programs may send a notification to a mobile device associated with a detected probable viewer of a monitor related to a content on monitor. Based on identifying the detected probable viewers, in an embodiment of the present invention, the one or more programs may broadcast content on the monitor and/or alter the existing content in some way based on characteristics associated with a detected probable viewer. The program code may determine these characteristics by accessing the mobile device of the viewer. In an embodiment of the present invention, the one or more programs may alter the existing content in some way based on the location of a probable viewer. For example, in an embodiment of the present invention, the one or more programs may enable sound accompanying the content of the monitors based upon determining that a detected probable viewer is within a certain vicinity of the monitor.

In addition to enabling short-term content delivery improvements, as discussed above, certain embodiments of the present invention supply content providers with data that these content providers may utilize going forward to provide more effective content to viewers. For example, in an embodiment of the present invention, one or more programs may analyze viewer information and produce analytics for utilization by content providers, including but not limited to, advertisers. The analytics provide these content providers with information about detected probable viewers of the content. In order to gauge the efficacy of the content, in an embodiment of the present invention, one or more programs may correlate individuals who are probable viewers of content advertising a given product on monitors in a given retain location with whether these individuals purchase the content, at the venue. For example, the venue may be a supermarket in which monitors advertise products that are on special. The program code may determine which users viewed an advertisement for a given product on a monitor in the store and then purchased the product at the checkout.

For ease of understanding, illustrations and descriptions of various aspects of embodiments of the present invention are described as being utilized in retail establishments with more than one monitor displaying content to individuals in this fixed location. However, this particular example is non-limiting and offered merely to provide a detailed example of one possible application of aspects of certain embodiments of the present invention. As understood by one of skill in the art, aspects of various embodiments of the present invention can be applied in a variety of physical environments to provide information regarding the viewing of content that is beneficial in each of these environments. For example, certain embodiments of the present invention could be utilized in a home setting to determine the identity of an individual viewing content on a monitor, such as a computer or a television. Understanding who is watching content provides enhanced information to ratings systems beyond just want is being watched in a given household. Embodiments of the present invention could also be utilized in an eating establishment with monitors, including but not limited to a sports bar, to determine which entertainment selections are most popular. This information could assist the owners of the establishment in selecting content that will drive increases in customer attendance.

Figure 2:
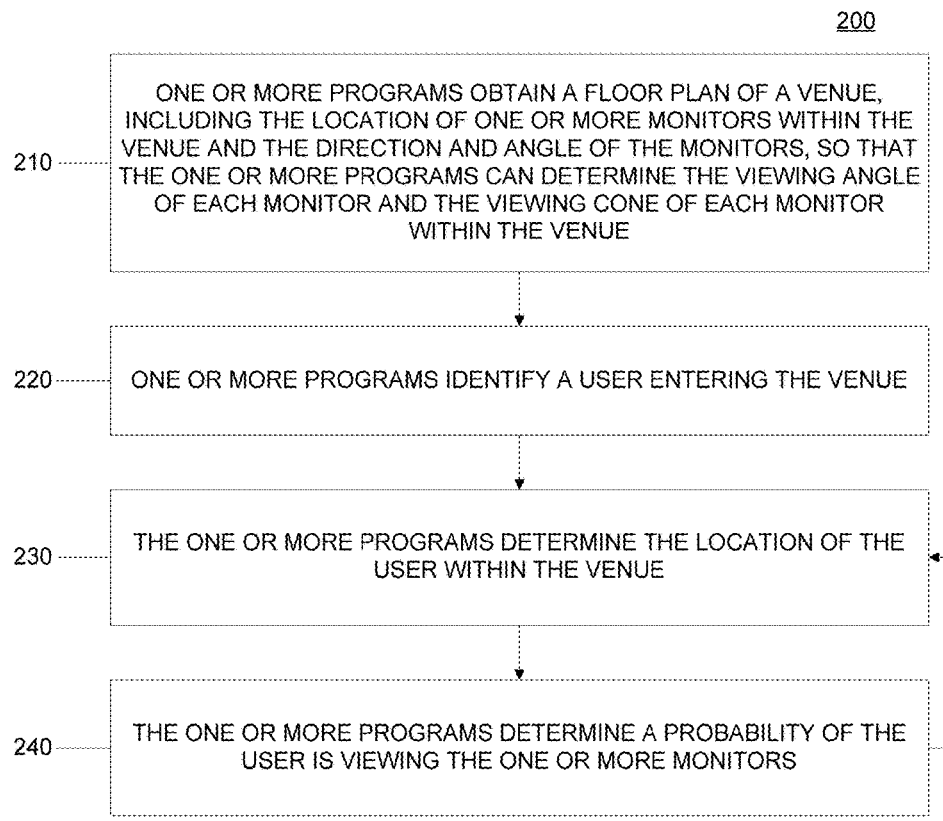
FIG. 2 depicts a workflow associated with aspects of an embodiment of the present invention.

FIG. 2 is a workflow of an embodiment of the present invention. Referring to FIG. 1, in an embodiment of the present invention, program code identifies a user entering a venue, including but not limited to a retail location (220). The program code determines the location of the user within the venue (230). In an embodiment of the present invention, the program code utilizes one or more existing applications on the user's personal computing device to identify this user and track the movement of the user within the venue and/or installs an application on the user's device that enables the program code to identify the user and track the user's movement. For example, in an embodiment of the present invention, a user may enable location services on his or her computing device, which can be accessed by the program code over a communications connection, such as a wireless connection or the Internet. Once the user has enabled the location services, the program code utilizes the services to track the location of the user and accesses additional data on the device to identify the user. In an embodiment of the present invention, the user may adjust the privacy features on his or her device to enable the program code to identify and track the user. The accessible data may be limited to the information needed to locate the user within the venue.

Certain embodiments of the present invention also include custom location-tracking services and systems, however, the utilization of known tools can decrease implementation costs. Thus, in embodiments of the present invention, the program code may interact with off-the-shelf location applications, known tools, which may be installed and/or executed on the user's computing device, in order to track the user's location within a venue. For illustrative purposes only, the utilization of known tools IBM® MobileFirst® Platform Presence Insights and IBM® Presence Insights is described herein. However, one of skill in the art will recognize that the program code can interface with similar known tools in order to identify users and track the movement of these users within a given venue, in accordance with certain aspects of an embodiment of the present invention. IBM® MobileFirst® Platform Presence Insights and IBM® Presence Insights are products of International Business Machines Corporation. IBM® is a registered trademark of International Business Machines Corporation, Armonk, N.Y., US.

In an embodiment of the present invention, the program code utilizes components of IBM® MobileFirst® Platform Presence Insights and/or IBM® Presence Insights to provide identifying information associated with the user, as well as to provide location based analytics, to the program code, so that the program code can identify the user entering the venue (220) and (e.g., continually) determine the location of the user within the venue (230).

IBM® Presence Insights uses sensors to collect and analyze location data, while IBM® MobileFirst® Platform Presence Insights provides additional information regarding mobile activity in and around a physical location (e.g., the venue). The program code in an embodiment of the present invention accesses an IBM® Presence Insights client on a user's mobile device to obtain information related to the device owner's trajectory and movement behavior, as it relates to defined site and zone regions, including different parts of the venue.

Utilizing aspects of IBM® Presence Insights, in an embodiment of the present invention, the program code identifies the individual (e.g., 220) by detecting the mobile device of the individual within a venue, based on the mobile device communicating through radio signals using various protocols (e.g., Bluetooth Low Energy (BLE), Wi-Fi 802.11 on 2.4 GHz and 5 GHz radio communication protocols). Upon detecting the device, the program identifies the device, (also referred to herein as a client) and therefore associates the device with the user and continues tracking the device to determine the location of the user within the venue (e.g., 230) by using a supported protocol, including a Globally Unique Identifier (GUID) that was assigned to the device and/or the MAC address for the device. The program may also access personally identifiable information (PII) on this device. To address privacy concerns, the PII, including the MAC address or GUID, may be encrypted by using a public key.

Figure 3:
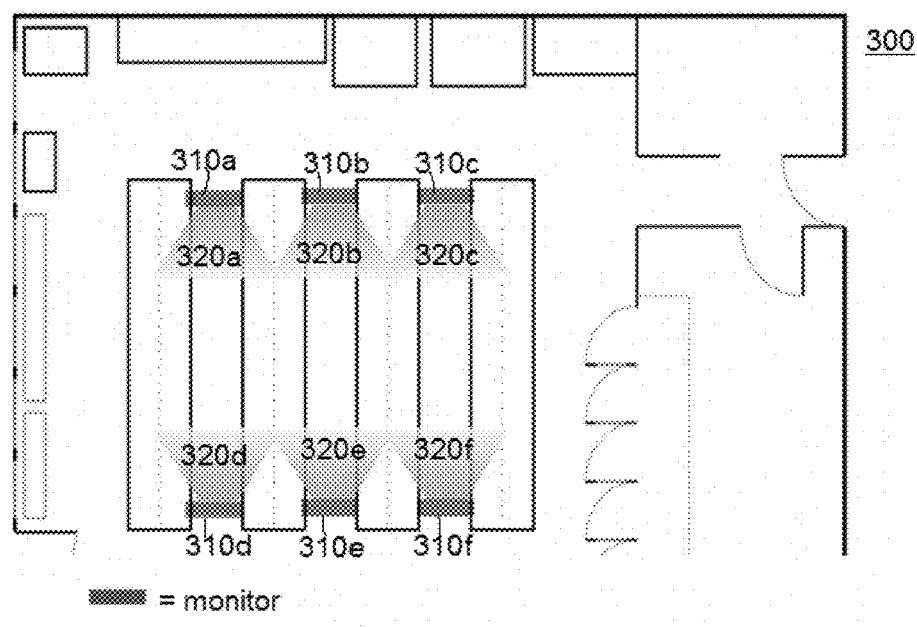
FIG. 3 depicts a workflow associated with aspects of an embodiment of the present invention.

FIG. 3 is an example of a floor plan 300 of a venue that can be configured utilizing sensors like those including, but not limited to those utilized in IBM® Presence Insights. To configure a physical venue for use in an embodiment of the present invention, the venue is fitted with sensing hardware and the floor plan 300 is uploaded by one or more programs executing on at least one processing circuit. As illustrated in FIG. 3, this example floor plan 300 includes six (6) monitors 310a-310f. Each monitor has a viewing cone 320a-320f defined by its viewing angle. Thus, as illustrated by FIG. 3, when the program code tracks the device to determine the location of the user within the venue (e.g., 230), the location of the user includes the location of the user relative to one or more monitor 310a-310f within the venue, as represented by the floor plan 300, as well as the trajectory of the computing device of the user. In an embodiment of the present invention, the program code obtains the floor plan 300 of a venue, including the location of one or more monitors 310a-310f within the venue and the direction and angle of the monitors (e.g., digital displays) so that the program code can determine the viewing angle of each monitor and the viewing cone of each monitor within the venue (210). Thus, in determining the location of the individual, the program code determines whether the individual is within the viewing cone 320a-320f of any of the one or more monitors 310a-310f and based on the user's distance from the monitor 310a-310f, whether the user is viewing content in the monitor 310a-310f. The one or more programs make this determination within a degree of confidence.

Returning to FIG. 2, for each monitor (e.g., 310a-310f, FIG. 3) in the floor plan (e.g., 300, FIG. 3) of the venue, based on the location of the user, the program code determines, in an embodiment of the present invention, a probability that the user is viewing the monitor (240). FIG. 2 illustrates how, in an embodiment of the present invention, the program code can continuously monitor the location of a user (230) and determine the user's location and the probability that the user is viewing the monitor (240). In an embodiment of the present invention, rather than continuously determining what a user is viewing in real time, the program code may analyze a user's movement through a venue during a given period of time and determine which monitors the viewer likely viewed during that defined time.

Figure 4:
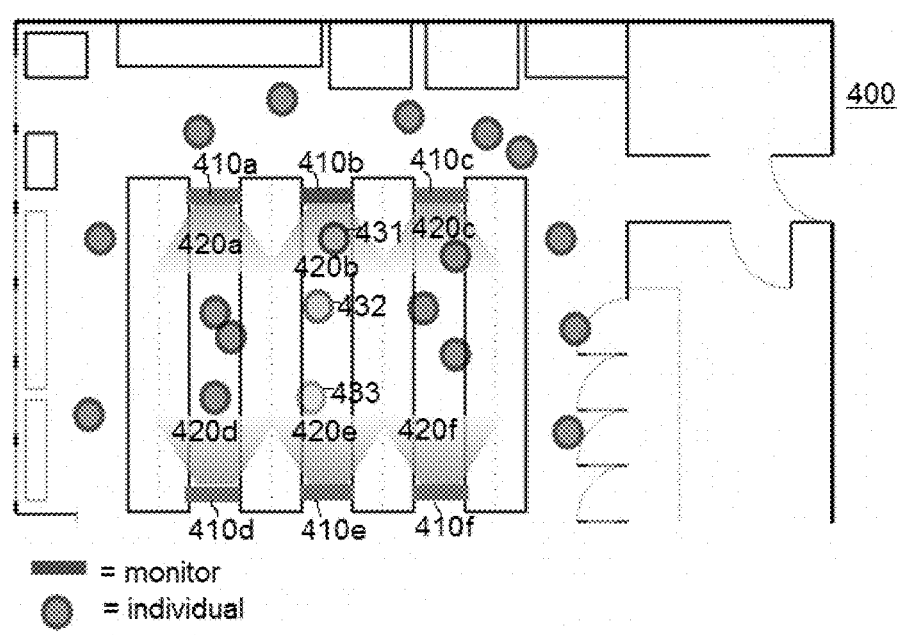
FIG. 4 illustrates a floor plan to demonstrate the program code, in an embodiment of the present invention.

FIG. 4 illustrates a floor plan 400 to demonstrate the program code, in an embodiment of the present invention, utilizing the location services of a computing device of an individual to determine the location of the individual (220, FIG. 2) and tracking the device to determine the location of the user within the venue (e.g., 230, FIG. 2), including relative to the monitors 410a-410f, in order to determine a probability that a user viewed content on a given monitor (e.g., 240, FIG. 2).

FIG. 4 illustrates a floor plan 400 of a venue in which a group of individuals are navigating through the venue. In an embodiment of the present invention, the program code determines that the pictured individuals are in the venue by utilizing the location services in the computing devices of the individuals and the sensors at the physical location. As seen in FIG. 4, the program code determines that certain individuals 431-433 are within the viewing cone 420b for a given monitor 410b. However, based on the distance of each of these individuals 431-433 from the monitor 410b, certain of the individuals 431 are less or more likely to be viewing the monitor 410b. For example, the individual 431 who is closest to the monitor 410b is most likely to be viewing content in the monitor 410b, which the individual 433 in the viewing cone 420b who is farthest from the monitor 410b is least likely to be viewing.

In an embodiment of the present invention, the one or more programs determine the likelihood that a given individual views a monitor, based in part on determining the direction in which the individual is moving. As aforementioned, the program code continuously utilizes the computing device of the individual and the hardware in the venue to determine the location of an individual at different points in time and can determine, based on changes in location of the individual over time, the direction in which an individual is moving. In an embodiment of the present invention, the program code may determine the trajectory of the computing device of a user by accessing a gyroscope and/or an accelerometer in the computing device of the user. In an embodiment of the present invention, the program code determines a level of confidence that is correlated with whether an individual viewed a given monitor, at a given time, based on the individual's distance from the monitor at that time and the trajectory of the computing device of the individual. In FIG. 4, the individuals 431-433 that potentially viewed the monitor 410b are depicted to show the level of confidence associated with each individual 431-433, i.e., the individuals farther away have a greater opacity than the individuals that are closer, representing a greater level of confidence.

Figure 5:
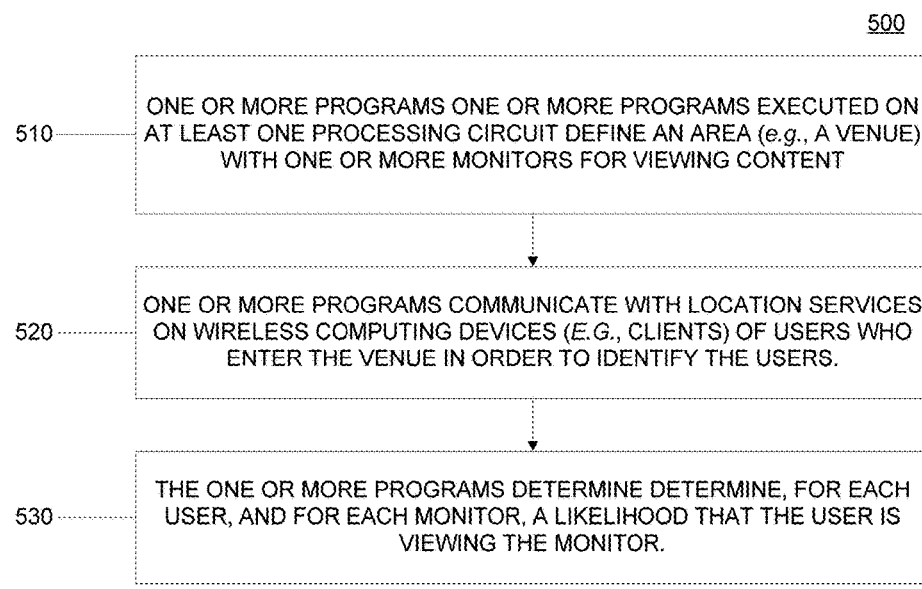
FIG. 5 is a workflow of an embodiment of the present invention.

FIG. 5 is a workflow 500 of an embodiment of the present invention that illustrates how aspects of an embodiment of the present invention can be utilized in a venue populated by more than one individual with a personal computing device. In an embodiment of the present invention, one or more programs executed on at least one processing circuit define an area (e.g., a venue) with one or more monitors for viewing content (510). Each of the one or more monitors has a viewing angle and is therefore viewable by individuals who are situated within a viewing cone defined by the viewing angle and within a pre-determined perpendicular distance from monitor. The one or more programs may define this venue or location by obtaining a floor plan that was uploaded by a user. The one or more programs may also obtain directions and angles of screens/displays from user inputs.

Returning to FIG. 5, the one or more programs communicate with location services on wireless computing devices (e.g., clients) of users who enter the venue in order to identify the users (520). The one or more programs determine, for each user, and for each monitor, a likelihood that the user is viewing the monitor (530). The one or more programs may make this determination in real time.

The one or more programs may determine the likelihood based on a number of determinations. For example, the one or more programs can determine (e.g., in real time) if a current location of the client is within the viewing cone. Thus, based on determining that the client is within the viewing cone, the one or more program may determine a trajectory of the client and utilize the trajectory to determining if the client is within the pre-determined perpendicular distance from monitor. Based on determining that the client is within the pre-determined perpendicular distance, the one or more programs may assign the users confidence levels, as related to each of the one or more monitors, where a higher confidence level indicates a greater likelihood the user is viewing the monitor and a lower confidence level indicates a lower likelihood the user is viewing the monitor.

The information generated by embodiments of the present invention regarding the likelihood users viewed monitors in a venue can be utilized to determine viewing popularity, or patterns of viewing, for advertisers, and to send notifications to people's cell phones based on the viewing data. In this way, embodiments of the present invention can use real time analytics to determine a physical location for each person, and can view patterns and trends for groups of people.

Embodiments of the present invention include a computer-implemented method, a computer program product and a computer system that include one or more programs executed by one or more processing circuits for defining a venue that includes at least one monitor for viewing content, where the at least one monitor includes a viewing angle and the at least one monitor is viewable by an individual situated within a viewing cone defined by the viewing angle and within a pre-determined perpendicular distance from monitor. The one or more programs identify, based on communicating with location services on each client of a plurality of clients, a plurality of users entering the venue, where each client of the plurality of clients includes a wireless device associated with a respective user of the plurality of users. The one or more programs determine, in real time, for each user of the plurality of users and for each monitor of at least one monitor, a likelihood that the user is viewing the at least one monitor. In making this determination, the one or more programs determine, for each user: in real time, if a current location of the client is within the viewing cone, a trajectory of the client, based on the trajectory of the client, and if the client is within the pre-determined perpendicular distance from monitor. Based on determining that the client is within the pre-determined perpendicular distance, the one or more programs assign a confidence level to the user. A higher confidence level indicates a greater likelihood the user is viewing the at least one monitor and a lower confidence level indicates a lower likelihood the user is viewing the at least one monitor.

In an embodiment of the present invention, the one or more programs transmit location data related to the plurality of users. The location data includes, for each user of the plurality of users, and for each monitor of at least one monitor, the likelihood that the user is viewing the at least one monitor.

In an embodiment of the present invention, the venue includes location sensing hardware, including but not limited to, a plurality of sensors defining zones within the venue. Thus, the one or more programs determine if the current location of the client is within the viewing cone by querying the sensors over the Internet and responsive to the querying, obtaining a current location of the client. The one or more programs determine if the current location is within the viewing cone.

In an embodiment of the present invention, the one or more programs determine the trajectory of the client by communicating with the location services of the client. The location service may include a global positioning system, an accelerometer, and/or a gyroscope.

In an embodiment of the present invention, viewing the at least one monitor includes the user viewing content displayed on the at least one monitor for given period of time.

In an embodiment of the present invention, the one or more programs assign a lower confidence level to the user and transmit a notification to the client of the user that includes content viewable on the at least one monitor.

In an embodiment of the present invention, the one or more programs identify the client in part by obtaining user preference information from the clients. The one or more programs may select, from the plurality of users, a group of users with a higher likelihood that each user of the group of users is viewing a first monitor of the at least one monitor. The one or more programs may also select, from the user preference information, user preference information associated with the group of users. The one or more programs may apply data analytics to the user preference information associated with the group of users to identify at least one common user preference, and based on identifying the at least one common user preference, the one or more programs may formulate and display, at the first monitor, content related to the at least one common user preference.

In an embodiment of the present invention, based on determining that the client is within the pre-determined perpendicular distance, the one or more programs activate sound on the monitor.

As shown in FIG. 6, computer system/server 12 is a computing resources that can be utilized as cloud computing node 10, is shown in the form of a general-purpose computing device. The components of computer system/server 12 may include, but are not limited to, one or more processors or processing units 16, a system memory 28, and a bus 18 that couples various system components including system memory 28 to processor 16. Computing nodes utilized in embodiments of the present invention include computer resources that execute the one or more programs described in FIGS. 1 and 4 as well as the client mobile devices utilized by individuals with a venue and monitored by the one or more programs.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
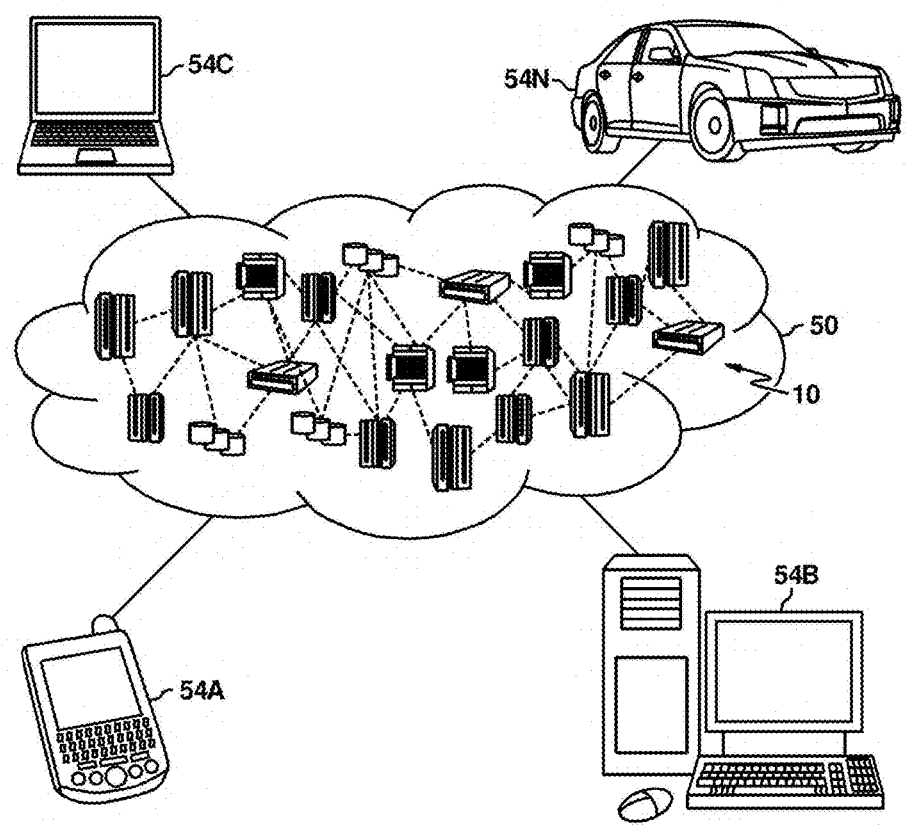
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
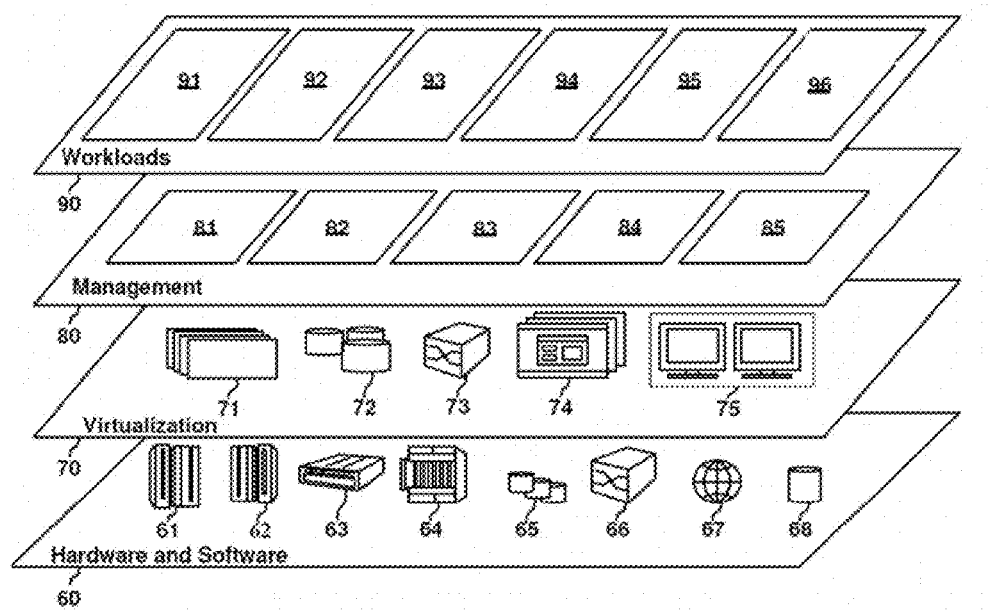
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and initiating and/or monitoring client devices within a defined environment 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
  defining, by one or more processors, a venue comprising at least one monitor for viewing content, wherein the at least one monitor comprises a viewing angle and the at least one monitor is viewable by an individual situated within a viewing cone defined by the viewing angle and within a pre-determined perpendicular distance from monitor;

identifying, by the one or more processors, based on communicating with location services on each client of a plurality of clients, a plurality of users entering the venue, wherein each client of the plurality of clients comprises a wireless device associated with a respective user of the plurality of users, and wherein each wireless device comprises a gyroscope and an accelerometer;

determining, by the one or more processors, in real time, for each user of the plurality of users and for each monitor of at least one monitor, a likelihood that the user is viewing the at least one monitor, wherein the determining comprises, for each user:

determining, by the one or more processors, in real time, if a current location of the client is within the viewing cone;

based on determining that the client is within the viewing cone, determining, by the one or more processors, a trajectory of the client, the trajectory comprising a direction of movement of the user through the venue, based on accessing the gyroscope and the accelerometer of the client, wherein determining the trajectory comprises:

obtaining, by the one or more processors, data from the client regarding movement of the client within the venue from the gyroscope and the accelerometer of the client; and analyzing, by the one or more processors, the data, to determine the direction of the movement of the user through the venue during a given time;

based on determining the trajectory of the client and the direction of the movement of the user through the venue during the given time, utilizing the trajectory to determine, by the one or more processors, if the client is within the pre-determined perpendicular distance from the at least one monitor at the given time;

based on determining that the client is within the pre-determined perpendicular distance, assigning, by the one or more processors, a confidence level to the user, wherein a higher confidence level indicates a greater likelihood the user is viewing the at least one monitor and a lower confidence level indicates a lower likelihood the user is viewing the at least one monitor at the given time;

based on the assigning comprising assigning the lower confidence level to the user, transmitting, by the one or more processors, a notification to the client of the user, wherein the notification comprises the content viewable on the at least one monitor; and based on the assigning comprising assigning the higher confidence level to the user, activating, by the one or more processors, sound on the monitor to accompany displayed content.

2. The computer-implemented method of claim 1, further comprising:

transmitting, by the one or more processors, location data related to the plurality of users, wherein the location data comprises, for each user of the plurality of users, and for each monitor of at least one monitor, the likelihood that the user is viewing the at least one monitor.

3. The computer-implemented method of claim 1, wherein the venue further comprises a plurality of sensors defining zones within the venue, the determining if the current location of the client is within the viewing cone comprising:

querying, by the one or more processors, over an Internet connection, a portion of the plurality of sensors;

responsive to the querying, obtaining, by the one or more processors, a current location of the client; and determining, by the one or more processors, if the current location is within the viewing cone.

4. The computer-implemented method of claim 1, wherein obtaining data from the client regarding movement of the client within the venue further comprises communicating with the location services.

5. The computer-implemented method of claim 1, wherein the location services are selected from the group consisting of: a global positioning system, an accelerometer, and a gyroscope.

6. The computer-implemented method of claim 1, wherein viewing the at least one monitor comprises the user viewing content displayed on the at least one monitor for given period of time.

7. The computer-implemented method of claim 1, wherein the identifying further comprises further comprises obtaining user preference information from the plurality of clients, the method further comprising:

selecting, by the one or more processors, from the plurality of users, a group of users with a higher likelihood that each user of the group of users is viewing a first monitor of the at least one monitor;

selecting, by the one or more processors, from the user preference information, user preference information associated with the group of users;

applying, by the one or more processors, data analytics, to the user preference information associated with the group of users to identify at least one common user preference; and based on identifying the at least one common user preference, formulating and displaying, by the one or more processors, at the first monitor, content related to the at least one common user preference.

8. A computer program product comprising:

a computer readable storage medium readable by one or more processors and storing instructions for execution by the processor for performing a method comprising:

defining, by the one or more processors, a venue comprising at least one monitor for viewing content, wherein the at least one monitor comprises a viewing angle and the at least one monitor is viewable by an individual situated within a viewing cone defined by the viewing angle and within a pre-determined perpendicular distance from monitor;

identifying, by the one or more processors, based on communicating with location services on each client of a plurality of clients, a plurality of users entering the venue, wherein each client of the plurality of clients comprises a wireless device associated with a respective user of the plurality of users, and wherein each wireless device comprises a gyroscope and an accelerometer;

determining, by the one or more processors, in real time, for each user of the plurality of users and for each monitor of at least one monitor, a likelihood that the user is viewing the at least one monitor, wherein the determining comprises, for each user:

determining, by the one or more processors, in real time, if a current location of the client is within the viewing cone;

based on determining that the client is within the viewing cone, determining, by the one or more processors, a trajectory of the client, the trajectory comprising a direction of movement of the user through the venue, based on accessing the gyroscope and the accelerometer of the client, wherein determining the trajectory comprises:

obtaining, by the one or more processors, data from the client regarding movement of the client within the venue from the gyroscope and the accelerometer of the client; and analyzing, by the one or more processors, the data, to determine the direction of the movement of the user through the venue during a given time;

based on determining the trajectory of the client and the direction of the movement of the user through the venue during the given time, utilizing the trajectory to determine, by the one or more processors, if the client is within the pre-determined perpendicular distance from the at least one monitor at the given time;

based on determining that the client is within the pre-determined perpendicular distance, assigning, by the one or more processors, a confidence level to the user, wherein a higher confidence level indicates a greater likelihood the user is viewing the at least one monitor and a lower confidence level indicates a lower likelihood the user is viewing the at least one monitor at the given time;

based on the assigning comprising assigning the lower confidence level to the user, transmitting, by the one or more processors, a notification to the client of the user, wherein the notification comprises the content viewable on the at least one monitor; and based on the assigning comprising assigning the higher confidence level to the user, activating, by the one or more processors, sound on the monitor to accompany displayed content.

9. The computer program product of claim 8, the method further comprising:
transmitting, by the one or more processors, location data related to the plurality of users, wherein the location data comprises, for each user of the plurality of users, and for each monitor of at least one monitor, the likelihood that the user is viewing the at least one monitor.

10. The computer program product of claim 8, wherein the venue further comprises a plurality of sensors defining zones within the venue, the determining if the current location of the client is within the viewing cone comprising:
querying, by the one or more processors, over an Internet connection, a portion of the plurality of sensors;
responsive to the querying, obtaining, by the one or more processors, a current location of the client; and
determining, by the one or more processors, if the current location is within the viewing cone.

11. The computer program product of claim 8 wherein obtaining data from the client regarding movement of the client within the venue further comprises communicating with the location services.

12. The computer program product of claim 11, wherein the location services are selected from the group consisting of: a global positioning system, an accelerometer, and a gyroscope.

13. The computer program product of claim 8, wherein viewing the at least one monitor comprises the user viewing content displayed on the at least one monitor for given period of time.

14. The computer program product of claim 8, wherein the identifying further comprises further comprises obtaining user preference information from the plurality of clients, the method further comprising:
selecting, by the one or more processors, from the plurality of users, a group of users with a higher likelihood that each user of the group of users is viewing a first monitor of the at least one monitor;
selecting, by the one or more processors, from the user preference information, user preference information associated with the group of users;
applying, by the one or more processors, data analytics, to the user preference information associated with the group of users to identify at least one common user preference; and
based on identifying the at least one common user preference, formulating and displaying, by the one or more processors, at the first monitor, content related to the at least one common user preference.

15. A system comprising:
a memory;
one or more processors in communication with the memory; and
program instructions executable by the processor via the memory to perform a method, the method comprising:
defining, by the one or more processors, a venue comprising at least one monitor for viewing content, wherein the at least one monitor comprises a viewing angle and the at least one monitor is viewable by an individual situated within a viewing cone defined by the viewing angle and within a pre-determined perpendicular distance from monitor;
identifying, by the one or more processors, based on communicating with location services on each client of a plurality of clients, a plurality of users entering the venue, wherein each client of the plurality of clients comprises a wireless device associated with a respective user of the plurality of users, and wherein each wireless device comprises a gyroscope and an accelerometer;
determining, by the one or more processors, in real time, for each user of the plurality of users and for each monitor of at least one monitor, a likelihood that the user is viewing the at least one monitor, wherein the determining comprises, for each user:
determining, by the one or more processors, in real time, if a current location of the client is within the viewing cone;
based on determining that the client is within the viewing cone, determining, by the one or more processors, a trajectory of the client, the trajectory comprising a direction of movement of the user through the venue, based on accessing the gyroscope and the accelerometer of the client, wherein determining the trajectory comprises:
obtaining, by the one or more processors, data from the client regarding movement of the client within the venue from the gyroscope and the accelerometer of the client; and
analyzing, by the one or more processors, the data, to determine the direction of the movement of the user through the venue during a given time;

based on determining the trajectory of the client and the direction of the movement of the user through the venue during the given time, utilizing the trajectory to determine, by the one or more processors, if the client is within the pre-determined perpendicular distance from the at least one monitor at the given time;

based on determining that the client is within the pre-determined perpendicular distance, assigning, by the one or more processors, a confidence level to the user, wherein a higher confidence level indicates a greater likelihood the user is viewing the at least one monitor and a lower confidence level indicates a lower likelihood the user is viewing the at least one monitor at the given timer;

based on the assigning comprising assigning the lower confidence level to the user, transmitting, by the one or more processors, a notification to the client of the user, wherein the notification comprises the content viewable on the at least one monitor; and based on the assigning comprising assigning the higher confidence level to the user, activating, by the one or more processors, sound on the monitor to accompany displayed content.

16. The system of claim 15, the method further comprising:

transmitting, by the one or more processors, location data related to the plurality of users, wherein the location data comprises, for each user of the plurality of users, and for each monitor of at least one monitor, the likelihood that the user is viewing the at least one monitor.

* * * * *